United States Patent
Yang et al.

(10) Patent No.: US 8,902,973 B2
(45) Date of Patent: Dec. 2, 2014

(54) PERCEPTUAL PROCESSING TECHNIQUES FOR VIDEO TRANSCODING

(75) Inventors: Kyeong H. Yang, Freehold, NJ (US); Sangseok Park, Eatontown, NJ (US)

(73) Assignee: Dialogic Corporation, Montreal (CA)

( * ) Notice: Subject to any disclaimer, the term of this patent is extended or adjusted under 35 U.S.C. 154(b) by 383 days.

(21) Appl. No.: 13/079,955

(22) Filed: Apr. 5, 2011

(65) Prior Publication Data

US 2012/0257672 A1  Oct. 11, 2012

(51) Int. Cl.
| H04N 7/12 | (2006.01) |
| H04N 19/154 | (2014.01) |
| H04N 19/172 | (2014.01) |
| H04N 19/176 | (2014.01) |
| H04N 19/61 | (2014.01) |
| H04N 19/136 | (2014.01) |
| H04N 19/115 | (2014.01) |
| H04N 19/124 | (2014.01) |
| H04N 19/40 | (2014.01) |
| H04N 19/157 | (2014.01) |

(52) U.S. Cl.
CPC ....... *H04N 19/002* (2013.01); *H04N 19/00266* (2013.01); *H04N 19/00278* (2013.01); *H04N 19/00781* (2013.01); *H04N 19/00139* (2013.01); *H04N 19/0006* (2013.01); *H04N 19/0009* (2013.01); *H04N 19/00472* (2013.01); *H04N 19/00212* (2013.01)
USPC ................................. 375/240.03; 375/240.24

(58) Field of Classification Search
None
See application file for complete search history.

(56) References Cited

U.S. PATENT DOCUMENTS

| 6,363,113 | B1 | 3/2002 | Faryar et al. | |
| 6,366,705 | B1 | 4/2002 | Chiu et al. | |
| 6,441,754 | B1* | 8/2002 | Wang et al. | 341/50 |
| 6,654,417 | B1* | 11/2003 | Hui | 375/240.03 |
| 2002/0181587 | A1* | 12/2002 | Vetro | 375/240.12 |
| 2005/0175109 | A1* | 8/2005 | Vetro et al. | 375/240.28 |
| 2005/0232497 | A1* | 10/2005 | Yogeshwar et al. | 382/232 |
| 2009/0086816 | A1* | 4/2009 | Leontaris et al. | 375/240.03 |
| 2010/0183069 | A1* | 7/2010 | Chen et al. | 375/240.03 |
| 2011/0002381 | A1 | 1/2011 | Yang et al. | |
| 2012/0020415 | A1* | 1/2012 | Yang et al. | 375/240.27 |

OTHER PUBLICATIONS

Liu et al., "Perceptually Motivated Adaptive Quantization Algorithm for Region-of-Interest Coding in H.264," LNCS 5353, 2008, pp. 129-137.
Minoo et al., "Perceptual Video Coding with H.264," RCE Dept., UCSD, Mar. 2009, pp. 741-745.
Puri et al., "Motion-Compensated Video Coding with Adaptive Perceptual Quantization," IEEE Transactions on circuits and Systems for Video Technology, Dec. 1991, pp. 351-361, 1(4).
Vetro et al., "Video Transcoding Architectures and Techniques: An Overview," IEEE Signal Processing Magazine, Mar. 2003, pp. 18-29.
Wiegand et al., "Overview of the H.264/AVC Video Coding Standard," IEEE Transactions on Circuits and Systems for Video Technology, Jul. 2003, pp. 560-576,13(7).
Yang et al., "Perceptual Quantization for Predictive Coding of Images," Dec. 1999, pp. 381-385.

* cited by examiner

*Primary Examiner* — Jorge L Ortiz Criado
*Assistant Examiner* — Zhubing Ren
(74) *Attorney, Agent, or Firm* — Chapin IP Law, LLC

(57) ABSTRACT

Systems and methods of video transcoding that employ perceptual processing techniques for enhancing the perceptual quality of transcoded video information, communications, entertainment, and other video content. Such systems and methods of video transcoding are operative to perform perceptual processing of an input video bitstream using predetermined information carried by the input bitstream. Having performed such perceptual processing of the input bitstream, the perceptual quality of transcoded video delivered to an end user is significantly improved.

21 Claims, 7 Drawing Sheets

PERCEPTUAL PROCESSING TECHNIQUES FOR VIDEO TRANSCODING

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of video transcoding, and more specifically to systems and methods of video transcoding that employ perceptual processing techniques for enhancing the perceptual quality of transcoded video information, communications, entertainment, and other video content.

BACKGROUND OF THE INVENTION

Systems and methods of video encoding are known that employ quantization techniques for reducing the bits from video encoders. Such video encoders frequently employ quantization with varying step-sizes that can have substantial effects on the output bit rates of the video encoders, and on the perceptual quality (also referred to herein as a/the "quality of experience" or "QoE") of encoded video information, communications, entertainment, and other video content (also referred to herein as an/the "encoded video"). For example, such video encoders can employ larger quantization step-sizes to perform coarser quantization, which can decrease the output bit rates of the video encoders and diminish the QoE for the encoded video. Further, such video encoders can employ smaller quantization step-sizes to perform finer quantization, which can increase the output bit rates of the video encoders and enhance the QoE for the encoded video. Accordingly, in such video encoders, it is generally considered desirable to employ quantization step-sizes that are large enough to constrain the output bit rates of the video encoders within a given bit budget, while at the same time providing the best possible QoE for the encoded video delivered to an end user.

In such video encoders, it is also generally considered desirable to maintain a consistent QoE throughout a sequence of video frames (also referred to herein as a/the "video sequence"), without having the QoE for the video sequence vary widely from video frame to video frame. Because the end user is typically a human in most video applications, prior attempts to maintain a consistent QoE throughout a video sequence have exploited the perceptual insensitivity characteristics of the human visual system (also referred to herein as a/the "HVS"). For example, a conventional approach employed in such video encoders for maintaining a consistent QoE in a video sequence, known as "perceptual quantization," typically includes performing coarser quantization in areas of video frames where distortion is generally less perceptible to the HVS, and performing finer quantization in areas of the video frames where distortion may be more perceptible to the HVS. Using a conventional perceptual quantization approach, such video encoders typically classify each macroblock (also referred to herein as a/the "MB") of each video frame in a video sequence as one of a plurality of distortion imperceptibility levels, based on a spatial variation for the MB, (typically represented as the sum of the mean removed absolute difference of pixel values in the MB), a temporal variation for the MB (typically represented as the magnitude of motion vector(s) for the MB), and a brightness of the MB (typically represented as the mean of pixel values in the MB). Having classified each MB of a video frame as one of the plurality of distortion imperceptibility levels, such video encoders typically employ a lower quantization parameter (also referred to herein as a/the "QP") or a higher QP for the MB, based on the distortion imperceptibility level of the respective MB. For example, such video encoders typically employ a lower QP for MBs having lower spatial and temporal variations and lower brightness, where the HVS can generally perceive distortion more easily. Further, such video encoders typically employ a higher QP for MBs having higher spatial and temporal variations and higher brightness, where the HVS is less likely to perceive such distortion.

Video transcoders have been increasingly employed due to the proliferation and diversity of multimedia applications, video coding standards, networks, displays, etc. In such video transcoders, video streams can be translated or "transcoded" into signal streams compressed according to coding formats supported by the networks that carry the video streams, and/or endpoint devices that receive the video streams, such as traditional personal computers (PCs), mobile PCs, personal digital assistants (PDAs), video-enabled mobile phones, mobile televisions (TVs), third and fourth generation (3G and 4G) phone sets, or any other suitable multimedia systems or devices. Such coding formats include the H.264 coding format (also referred to herein as the "MPEG-4 Advanced Video Coding (AVC) standard"), which has generally improved the efficiency of video encoding, resulting in an increased need for video transcoders that can support the H.264 coding format in real-time video communications applications, video streaming applications, etc.

As in video encoders, it is generally considered desirable in video transcoders to provide the best possible QoE for transcoded video information, communications, entertainment, and other video content (also referred to herein as a/the "transcoded video") delivered to the end user. However, perceptual quantization approaches typically employed by video encoders for maintaining a consistent QoE in video sequences have drawbacks when employed in conjunction with video transcoders. For example, a video encoder typically receives a relatively high quality video input, whereas a video transcoder receives a video input that has already been encoded by an external video encoder, and may therefore be of lower quality. Further, the characteristics of the external video encoder that encoded the video input may be unknown to the video transcoder. Because the video input of a video transcoder has typically already been encoded by an external video encoder with possibly unknown characteristics, the video transcoder employing a conventional perceptual quantization approach may classify the MBs of video frames from the video input based on inaccurate spatial variation, temporal variation, and/or brightness information for the respective MBs, resulting in the use of QPs that may not provide the best possible QoE for the transcoded video delivered to the end user. For example, such problems with the classification of MBs of video frames within the video transcoder may be more likely to occur if the external video encoder has employed higher QPs for MBs that have higher spatial variation, higher temporal variation, and/or higher brightness. Such use of higher QPs can significantly reduce the spatial variation, and can cause a video transcoder employing a conventional perceptual quantization approach to use a smaller QP when encoding such MBs, resulting in a waste of bits where the HVS is less likely to perceive such distortion.

Moreover, the video input received at a video transcoder, and/or the output of a video decoder within the video transcoder, can carry information that may be useful in the classification of the MBs of video frames from the video input. For example, if an external video encoder from which the video transcoder received the video input employed perceptual quantization in the encoding of the video, then such information may be useful in classifying the MBs of the video frames within the video transcoder. However, a video transcoder employing a conventional perceptual quantization approach may not take into account such information when classifying the MBs. Information about the QPs employed for MBs encoded by the external video encoder using a skip coding mode may also be useful in the classification of the MBs within the video transcoder. However, video frames compressed according to the H.264 coding format do not generally carry such QP information for the MBs of video frames. Further, a video transcoder employing a conventional perceptual quantization approach may not have the capability of estimating the QPs for such MBs of video frames compressed according to the H.264 coding format when the skip coding mode is employed.

It would therefore be desirable to have systems and methods of video transcoding that employ perceptual processing techniques which avoid at least some of the drawbacks of the conventional perceptual quantization approaches described above.

BRIEF SUMMARY OF THE INVENTION

In accordance with the present application, systems and methods of video transcoding are disclosed that employ perceptual processing techniques for enhancing the perceptual quality (also referred to herein as a/the "quality of experience" or "QoE") of transcoded video information, communications, entertainment, and other video content (also referred to herein as a/the "transcoded video"). Such systems and methods of video transcoding are operative to perform perceptual processing of an input video bitstream (also referred to herein as an/the "input bitstream") using predetermined information carried by the input bitstream. Having performed such perceptual processing of the input bitstream, the QoE for transcoded video delivered to an end user is significantly improved.

In accordance with one aspect, a system for video transcoding that employs a perceptual processing technique includes a video decoder and a video encoder. In accordance with an exemplary aspect, the video encoder includes a perceptual classification component, a rate control component, a motion estimation and compensation component, a transformation component, a perceptual quantization parameter modulation component, a quantization component, and a coding component. In accordance with another exemplary aspect, the coding component is operative to perform entropy coding. The video decoder is operative to receive an input bitstream, including a plurality of video frames, from an external video encoder. In accordance with still another exemplary aspect, the plurality of video frames from the input bitstream comprise a plurality of YUV video frames. The video decoder is further operative to decode the plurality of video frames, and to provide decoded versions of the video frames to each of the perceptual classification component, the rate control component, and the motion estimation and compensation component, within the video encoder. The video decoder is also operative to extract predetermined information from the input bitstream, and to provide the predetermined information to the perceptual classification component within the video encoder. In accordance with a further exemplary aspect, the predetermined information extracted from the input bitstream can include, for each video frame from the input bitstream, video frame information such as the video frame type and the total number of bits in the video frame, macroblock (also referred to herein as a/the "MB") information such as the MB type for each MB in the video frame and the total number of bits in each MB in the video frame, and/or quantization parameter (also referred to herein as a/the "QP") information such as the QP used to encode each MB in the video frame and the quantization step-size associated with the QP used to encode each MB in the video frame.

In accordance with an exemplary aspect, in a mode of operation the perceptual classification component is operative to calculate a distortion imperceptibility for each MB in each video frame from the input bitstream. In accordance with an exemplary aspect, the perceptual classification component is operative to calculate the distortion imperceptibility for each MB based at least on a calculated spatial variation for the MB, and a calculated brightness of the MB. In accordance with another exemplary aspect, the perceptual classification component is operative to adjust the calculated spatial variation for each MB, using at least some of the QP information contained in the predetermined information extracted from the input bitstream. The perceptual classification component is further operative to adjust the distortion imperceptibility for the MB based at least on a likelihood that the external video encoder employed perceptual processing in the encoding of the input bitstream, and/or on one or more estimated QPs for MBs that were encoded by the external video encoder using a skip coding mode. Using at least some of the QP information and at least some of the MB information contained in the predetermined information extracted from the input bitstream, the perceptual classification component is also operative to determine the likelihood that the external video encoder employed perceptual processing based, at least in part, on the average QP used by the external video encoder to encode the input bitstream, and the average number of bits per MB, excluding any MBs that were skipped in the respective video frame.

In further accordance with this exemplary mode of operation in this exemplary aspect, the perceptual classification component is operative to determine a distortion imperceptibility level for each MB in the video frame based at least on the calculated distortion imperceptibility for the MB. In accordance with an exemplary aspect, each distortion imperceptibility level has an associated threshold value, and the respective threshold values monotonically increase for each higher level of distortion imperceptibility. In accordance with another exemplary aspect, each threshold value is dependent upon a picture resolution, as determined from the video frame information contained in the predetermined information extracted from the input bitstream. The perceptual classification component is further operative to generate a distortion imperceptibility map using the distortion imperceptibility levels for the MBs in the video frame. In accordance with a further exemplary aspect, because large differences in QPs used to encode adjacent MBs in a video frame can adversely affect the perceptual quality of transcoded video at the boundaries of such MBs, the perceptual classification component is operative to adjust the distortion imperceptibility levels using the distortion imperceptibility levels for adjacent MBs in the video frame. The perceptual classification component is also operative to provide the information contained in the distortion imperceptibility map to the perceptual quantization parameter modulation component.

In still further accordance with this exemplary mode of operation, the rate control component is operative to generate a QP and a target number of bits to be allocated for the video frame, using a predetermined rate control function, such as a video frame layer rate control function, an MB layer rate control function, a slice layer rate control function, or any other suitable type of rate control function. The rate control component is further operative to provide an indication of the QP and the target number of bits to be allocated for the video frame to the perceptual QP modulation component. Using the information from the distortion imperceptibility map, and the target number of bits from the rate control function, the perceptual QP modulation component is operative to modulate the QP for each MB in the video frame based at least on its associated distortion imperceptibility level. In accordance with an exemplary aspect, the perceptual QP modulation component is operative, for all MBs in the video frame, to find a set of QPs that provides an estimated number of bits to be allocated for the video frame that is closest to the target number of bits generated by the rate control component. The perceptual QP modulation component is further operative to provide the QPs for the respective MBs in the video frame to the quantization component. In addition, the motion estimation and compensation component is operative to perform motion estimation and motion compensated prediction on the decoded video frames, to calculate motion compensated prediction errors (also referred to herein as the "MCP errors") for the MBs in each video frame, and to provide the MCP errors for the respective video frames to the transformation component, which, in turn, provides, to the quantization component, transform coefficients for the MCP errors that describe prediction correction. Using the QPs for the respective MBs in each video frame from the perceptual QP modulation component, and the transform coefficients for the MCP errors from the transformation component, the quantization component is operative to quantize the respective video frames, and to provide quantized versions of the respective video frames to the coding component, which, in turn, is operative to encode the video frames, and to provide the transcoded video in an output video bitstream (also referred to herein as an/the "output bitstream") for subsequent display to the end user.

By employing predetermined information carried by an input bitstream to classify each MB in each video frame in the input bitstream, creating distortion imperceptibility maps for the respective video frames using the classifications for the respective MBs, and performing perceptual processing of the respective video frames using the information contained in the distortion imperceptibility maps, enhanced perceptual quality of transcoded video information, communications, entertainment, and other video content delivered to an end user can be achieved.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of video transcoding are disclosed that employ perceptual processing techniques for enhancing the perceptual quality (also referred to herein as a/the "quality of experience" or "QoE") of transcoded video information, communications, entertainment, and other video content (also referred to herein as a/the "transcoded video"). Such systems and methods of video transcoding are operative to perform perceptual processing of an input video bitstream (also referred to herein as an/the "input bitstream") using predetermined information carried by the input bitstream. Having performed such perceptual processing of the input bitstream, the QoE for transcoded video delivered to an end user is significantly improved.

Figure 1:
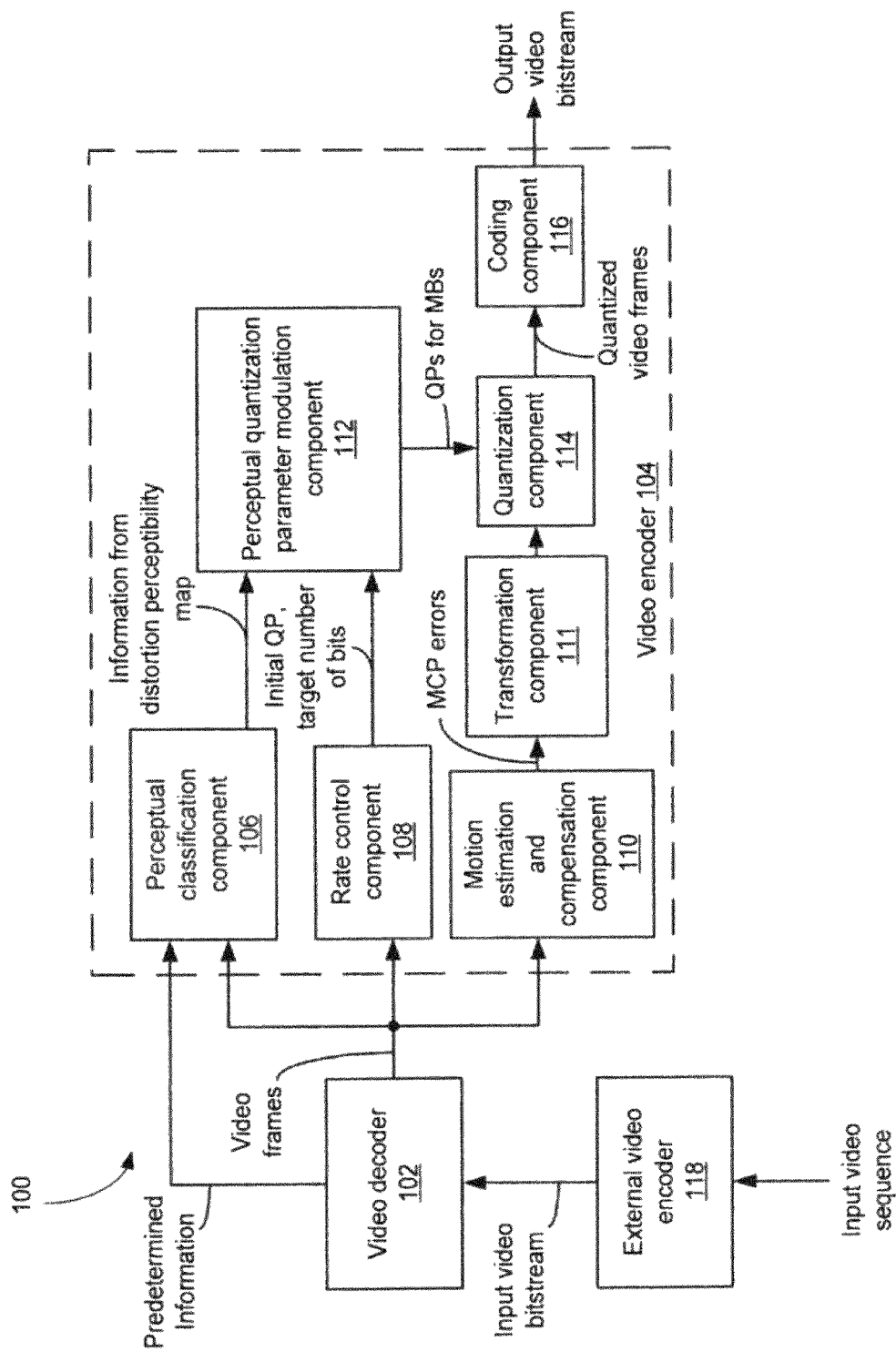
FIG. 1 is a block diagram of an exemplary video transcoding system that employs perceptual processing, in accordance with an exemplary embodiment of the present application.

FIG. 1 depicts an illustrative embodiment of an exemplary video transcoding system 100 that employs a perceptual processing technique, in accordance with the present application. As shown in FIG. 1, the video transcoding system 100 includes a video decoder 102 and a video encoder 104. In accordance with the illustrative embodiment of FIG. 1, the video encoder 104 includes a perceptual classification component 106, a rate control component 108, a motion estimation and compensation component 110, a transformation component 111, a perceptual quantization parameter modulation component 112, a quantization component 114, and a coding component 116. By way of example, the coding component 116 may be operative to perform entropy coding, or any other suitable type of coding. An external video encoder 118 is operative to generate an encoded input bitstream from an input video sequence, and to provide the input bitstream, including a plurality of video frames, to the video decoder 102. For example, the plurality of video frames included in the input bitstream may comprise a plurality of YUV video frames, or any other suitable type of video frames. The video decoder 102 is operative to decode the plurality of video frames, and to provide decoded versions of the video frames to each of the perceptual classification component 106, the rate control component 108, and the motion estimation and compensation component 110, within the video encoder 104. The video decoder 102 is further operative to extract predetermined information from the input bitstream, and to provide the predetermined information to the perceptual classification component 106. For example, for each video frame included in the input bitstream, the predetermined information extracted from the input bitstream may include, but is not limited to, video frame information such as the video frame type and the total number of bits in the video frame, macroblock (also referred to herein as a/the "MB") information such as the MB type for each MB in the video frame and the total number of bits in each MB in the video frame, and/or quantization parameter (also referred to herein as a/the "QP") information such as the QP used to encode each MB in the video frame and the quantization step-size associated with the QP used to encode each MB in the video frame.

In further accordance with the illustrative embodiment of FIG. 1, the perceptual classification component 106 is operative to calculate a distortion imperceptibility, $D_p$, for each MB in each video frame from the input bitstream, based at least on a calculated spatial variation for the MB, and a calculated brightness of the MB. For example, the distortion imperceptibility, $D_p$, for each MB, calculated by the perceptual classification component 106, can be expressed as a decreasing function of the calculated spatial variation for the MB, and the calculated brightness of the MB, as follows, $$D_p = f(\text{MAD}, \text{brightness}), \quad (1)$$

in which "MAD" (also referred to herein as a/the "mean removed absolute difference" of pixel values in the MB) represents the calculated spatial variation for the MB, and "brightness" represents the calculated brightness of the MB (also referred to herein as a/the "mean" of pixel values in the MB). The perceptual classification component 106 is further operative to calculate the MAD of the respective MB by summing the MADs corresponding to a plurality of M×N blocks (e.g., 4 M×N blocks, or any other suitable number of blocks) within the MB. For example, the MAD of one of the M×N blocks within the MB, calculated by the perceptual classification component 106, can be expressed as $$MAD = \frac{1}{M*N} \sum_{i=0}^{M-1} \sum_{j=0}^{N-1} \left| \text{block}(i,j) - \frac{\sum_{i=0}^{M-1} \sum_{j=0}^{N-1} \text{block}(i,j)}{M*N} \right|, \quad (2)$$

in which "block (i, j)" represents a pixel at the (i, j) position within the M×N block of the respective MB, which is derived from at least one component of the video frame, such as the luminance component, Y, the chrominance component, U, and the chrominance component, V. The perceptual classification component 106 is also operative to calculate the corresponding brightness of the M×N block within the respective MB. For example, the brightness of one of the M×N blocks within the MB, calculated by the perceptual classification component 106, can be expressed as $$\text{brightness} = \frac{1}{M*N} \sum_{i=0}^{M-1} \sum_{j=0}^{N-1} |\text{block}(i,j)|. \quad (3)$$

Accordingly, the distortion imperceptibility, $D_p$, for each MB in a video frame can be expressed as an increasing function of MAD and brightness, as follows, $$D_p = \alpha \cdot \text{MAD}^{w1} + \beta \cdot \text{brightness}^{w2}, \quad (4)$$

in which "α" can be set to be equal to 0.8 or any other suitable value, "β" can be set to be equal to 0.2 or any other suitable value, and "w1" and "w2" can each be set to be equal to ⅔ or any other suitable value.

It is noted that if the external video encoder 118 employs a relatively large QP for encoding a relatively complicated MB from the input sequence, then some of the details contained in that MB may effectively get lost in the encoding process within the external video encoder 118. As a result, the perceptual classification component 106 may calculate an inaccurate distortion imperceptibility, $D_p$, for that MB. For example, the perceptual classification component 106 may produce a distortion imperceptibility, $D_p$, that is lower than it should be for such a relatively complicated MB, based on a spatial variation (MAD) that is too low. Consequently, the quantization component 114 may quantize such a relatively complicated MB using a QP that is smaller than warranted by its distortion imperceptibility, $D_p$, potentially wasting a significant number of bits in the encoding process within the video encoder 104.

To avoid such a potential waste of bits within the video encoder 104, and to reduce perceptual classification errors that may result therefrom, the perceptual classification component 106 is operative to adjust the calculated spatial variation (MAD) for each MB, using at least some of the QP information contained in the predetermined information extracted from the input bitstream. For example, the adjusted spatial variation (also referred to herein as a/the "$\overline{\text{MAD}}$") of one of the M×N blocks within the MB, as adjusted by the perceptual classification component 106, can be expressed as $$\overline{\text{MAD}} = \text{MAD} \times f(\text{QP}), \quad (5)$$

in which "f(QP)" is a function of the quantization step-size associated with the QP used to encode the respective MB. Moreover, if the input bitstream is to be transcoded into a signal stream compressed according to the H.264 coding format (also referred to herein as the "MPEG-4 Advanced Video Coding (AVC) standard"), then the function, f(QP), in equation (5) above, can be expressed as $$f(\text{QP}) = \max(1, (\text{step\_size}(\text{QP})/\text{step\_size}(16))^{w3}), \quad (6)$$

in which "step_size(QP)" represents the step-size corresponding to the QP used to encode the respective MB, as defined in the H.264 coding standard, "step_size (16)" represents the step-size corresponding to a QP equal to 16, as defined in the H.264 coding standard, and "w3" can be set to be equal to 0.5 or any other suitable value.

It is further noted that an inefficient use of bits within the video encoder 104 can also occur if the external video encoder 118 employs perceptual quantization when encoding the input bitstream. For example, using perceptual quantization, the external video encoder 118 may employ, at least at some times, a smaller QP for one or more relatively simple MBs, and employ, at least at some times, a larger QP for one or more relatively complicated MBs. To avoid such inefficient use of bits within the video encoder 104, and to reduce the perceptual classification errors that may result therefrom, the perceptual classification component 106 is further operative to adjust the distortion imperceptibility for each MB based at least on a likelihood that the external video encoder 118 employed perceptual processing in the encoding of the input bitstream.

Using at least some of the QP information and at least some of the MB information contained in the predetermined information extracted from the input bitstream, the perceptual classification component 106 is operative to calculate the average QP (also referred to herein as a/the "$QP_{avg}$") used by the external video encoder 118 to encode the MBs in the video frames of the input bitstream, and to calculate the average number of bits (also referred to herein as a/the "$\text{bits}_{avg}$") per MB in the respective video frames, excluding any MBs that may have been skipped in the video frame. The perceptual classification component 106 is further operative to determine the likelihood that the external video encoder 118 employed perceptual processing based at least on the calculated average QP, and the calculated average number of bits per MB. For example, for the coded MBs in the video frames of the input bitstream, the average QP ($QP_{avg}$), calculated by the perceptual classification component 106, can be expressed as $$QP_{avg} = \text{average}(QP_{MB}), \quad (7)$$

in which "$QP_{MB}$" represents the actual QPs used by the external video encoder 118 to encode the respective MBs in a respective video frame. Further, for the coded MBs in the video frames of the input bitstream, the average number of bits ($bits_{avg}$) per MB, calculated by the perceptual classification component 106, can be expressed as $$bits_{avg} = \text{average}(bits_{MB}), \quad (8)$$

in which "$bits_{MB}$" represents the actual number of bits for the respective MBs in the respective video frame.

Using the average QP ($QP_{avg}$) and the average number of bits ($bits_{avg}$) per MB expressed above in equations (7) and (8), respectively, the likelihood that the external video encoder 118 employed perceptual processing in the encoding of the input bitstream, as determined by the perceptual classification component 106, can be expressed as $$\text{likelihood}_{PQ} = \text{average}((QP_{MB} - QP_{avg})*(bits_{MB} - bits_{avg})/bits_{avg}). \quad (9)$$

Based on whether or not the $\text{likelihood}_{PQ}$, as expressed in equation (9) above, exceeds a predetermined threshold value, $\text{thr}_{likelihood}$, the perceptual classification component 106 is operative to set or reset a flag, $PP_{flag}$, to indicate whether or not the external video encoder 118 employed perceptual processing, as follows, $$PP_{flag} = \begin{cases} 1 & \text{if } \text{likelihood}_{PQ} > \text{thr}_{likelihood} \\ 0 & \text{otherwise} \end{cases}, \quad (10)$$

in which "$\text{thr}_{likelihood}$" can be set to be equal to 0.8 or any other suitable value.

Accordingly, using the adjusted spatial variation ($\overline{MAD}$) of the M×N blocks within the MBs in each video frame, as expressed in equation (5) above, and the flag, $PP_{flag}$, indicating whether or not the external video encoder 118 employed perceptual processing, as expressed in equation (10) above, the distortion imperceptibility, $D_p$, for each MB in each video frame included in the input bitstream can be expressed as $$D_p = \alpha \cdot \overline{MAD}^{w1} + \beta \cdot \text{brightness}^{w2} + PP_{flag} \cdot g(QP_{MB} - QP_{avg}), \quad (11)$$

in which "$g(QP_{MB} - QP_{avg})$" is a function of the difference between $QP_{MB}$ and $QP_{avg}$. For example, the function, $g(QP_{MB} - QP_{avg})$, may be expressed as $$g(QP_{MB} - QP_{avg}) = 4.0 * (QP_{MB} - QP_{avg})^{w4}, \quad (11.1)$$

in which "w4" may be set equal to 1.2, or any other suitable value.

To avoid further inefficient use of bits within the video encoder 104 and to further reduce the perceptual classification errors that may result therefrom, the perceptual classification component 106 is operative to estimate the QPs for MBs that were encoded by the external video encoder 118 using a skip coding mode, and to adjust the distortion imperceptibility, $D_p$, for each MB based at least on the estimated QPs for the skipped MBs. It is noted that video decoders are generally incapable of determining, from input bitstreams, the QPs that external video encoders may have employed for any skipped MBs. For example, such MBs may have been skipped because prediction errors for the MBs were relatively small, or because the external video encoders employed relatively large QPs for encoding the MBs. Such QP information for skipped MBs can be used in the function, f(QP), in equation (5) above, and/or in the function, $g(QP_{MB} - QP_{avg})$, in equation (11) above.

In accordance with the illustrative embodiment of FIG. 1, the QP for each skipped MB in each video frame included in the input bitstream, as estimated by the perceptual classification component 106, can be expressed as $$QP_{skip} = \begin{cases} QP_{previously\_encoded\_MB} & \text{if } PP_{flag} = 0 \\ \text{average}(QP_{top\_bottom\_left\_right\_MBs}) + \delta & \text{if } PP_{flag} = 1 \end{cases}, \quad (12)$$

in which "$QP_{previously\_encoded\_MB}$" corresponds to the QP for the previously encoded MB in the video frame, "average ($QP_{top\_bottom\_left\_right\_MBs}$)" corresponds to the average of the QPs for the MBs in the top, bottom, left, and right positions in the video frame, and "$\delta$" can be set to be equal to 2 or any other suitable value. It is noted that the value, $\delta$, is employed in equation (12) above to reduce the possibility that a skipped MB was encoded due to a coding error.

The perceptual classification component 106 is further operative to determine a distortion imperceptibility level for each MB in each video frame included in the input bitstream, based at least on the calculated distortion imperceptibility, $D_p$, for the MB. In further accordance with the illustrative embodiment of FIG. 1, each distortion imperceptibility level has an associated threshold value, and the respective threshold values monotonically increase for each higher level of distortion imperceptibility. For example, the perceptual classification component 106 may be operative to classify the MBs into 8 levels (i.e., 0, 1, 2, 3, 4, 5, 6, 7), or any other suitable number of levels, based on the distortion imperceptibility values, $D_p$, for the respective MBs. Further, the perceptual classification component 106 may classify the MBs having higher distortion imperceptibility values, $D_p$, into the higher levels of the 8 levels, and classify the MBs having lower distortion imperceptibility values, $D_p$, into the lower levels of the 8 levels, with the associated threshold values monotonically increasing from the lowest level, 0, to the highest level, 7. It is noted that any other suitable manner (known to those of ordinary skill in the art) of classifying such MBs having associated distortion imperceptibility values, $D_p$, may be employed.

It is further noted that the distortion imperceptibility, $D_p$, for each MB in each video frame is generally dependent on the size or resolution of the video frame that includes the MB. Accordingly, the threshold values, $Thr_i$, associated with the levels i to i+1, can be expressed as $$Thr_i = \begin{bmatrix} \alpha_i & \text{if picture\_size} < QCIF \\ \alpha_i + \dfrac{\text{picture\_size} - QCIF}{VGA - QCIF} \cdot (\beta_i - \alpha_i) & \text{if } QCIF \leq \text{picture\_size} < VGA \\ \beta_i & \text{if picture\_size} \geq VGA \end{bmatrix} \quad (13)$$

in which "QCIF" corresponds to the size or resolution of a video frame in the quarter common intermediate format (176×144 pixel resolution), "VGA" corresponds to the size or resolution of a video frame in the video graphics array format (640×480 pixel resolution), and "picture_size" corresponds to the size or resolution of the video frame that includes the respective MB. The perceptual classification component 106 is operative to determine the picture_size from the video frame information contained in the predetermined information extracted from the input bitstream. It is noted that "$\alpha_i$" in equation (13) above can be set to be equal to 450, 750, 1050, 1500, 2100, 2850, and 3750 for i equal to 0, 1, 2, 3, 4, 5, and 6, respectively, or any other suitable values, and that "$\beta_i$" in equation (13) above can be set to be equal to 300, 500, 700, 1000, 1400, 1900, and 2500 for i equal to 0, 1, 2, 3, 4, 5, and 6, respectively, or any other suitable values.

Figure 2A:
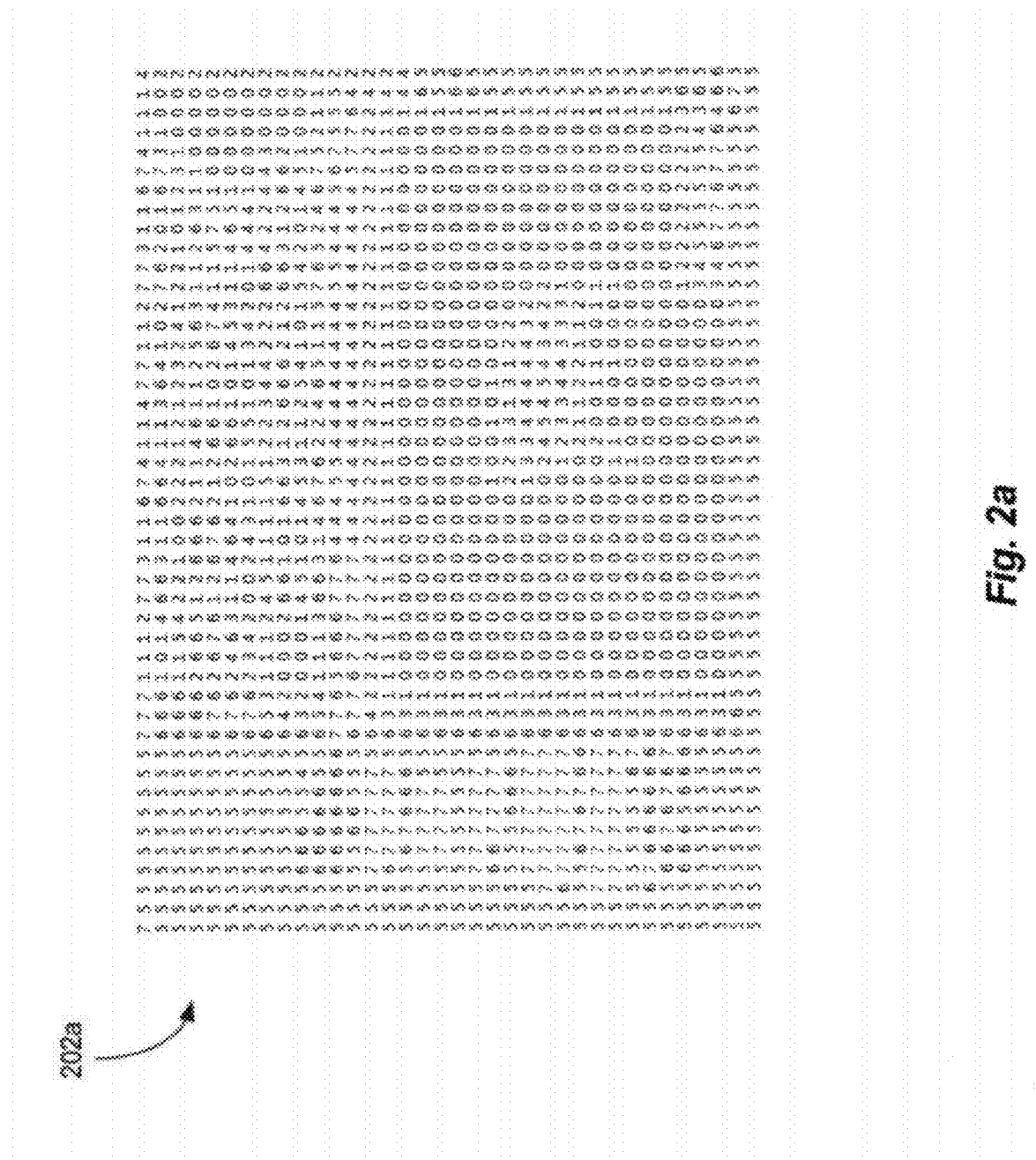
FIG. 2a is a table illustrating an exemplary distortion imperceptibility map for an exemplary video frame from an exemplary video bitstream.
Figure 2B:
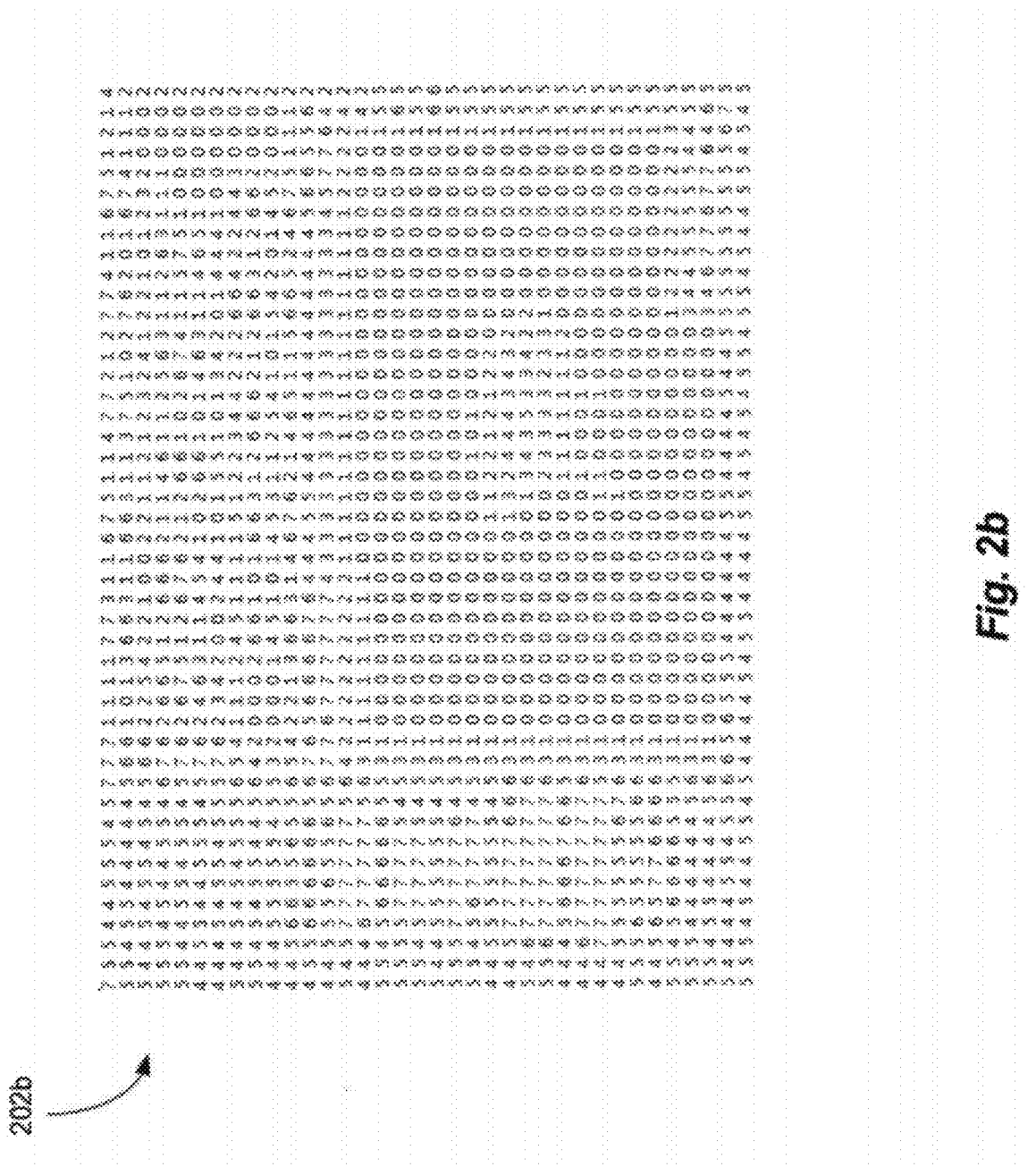
FIG. 2b is a table illustrating another exemplary distortion imperceptibility map for the exemplary video frame after decoding, in which distortion imperceptibility levels for macroblocks in the video frame have been determined using an exemplary first perceptual classification technique that can be implemented by the video transcoding system of FIG. 1.
Figure 2C:
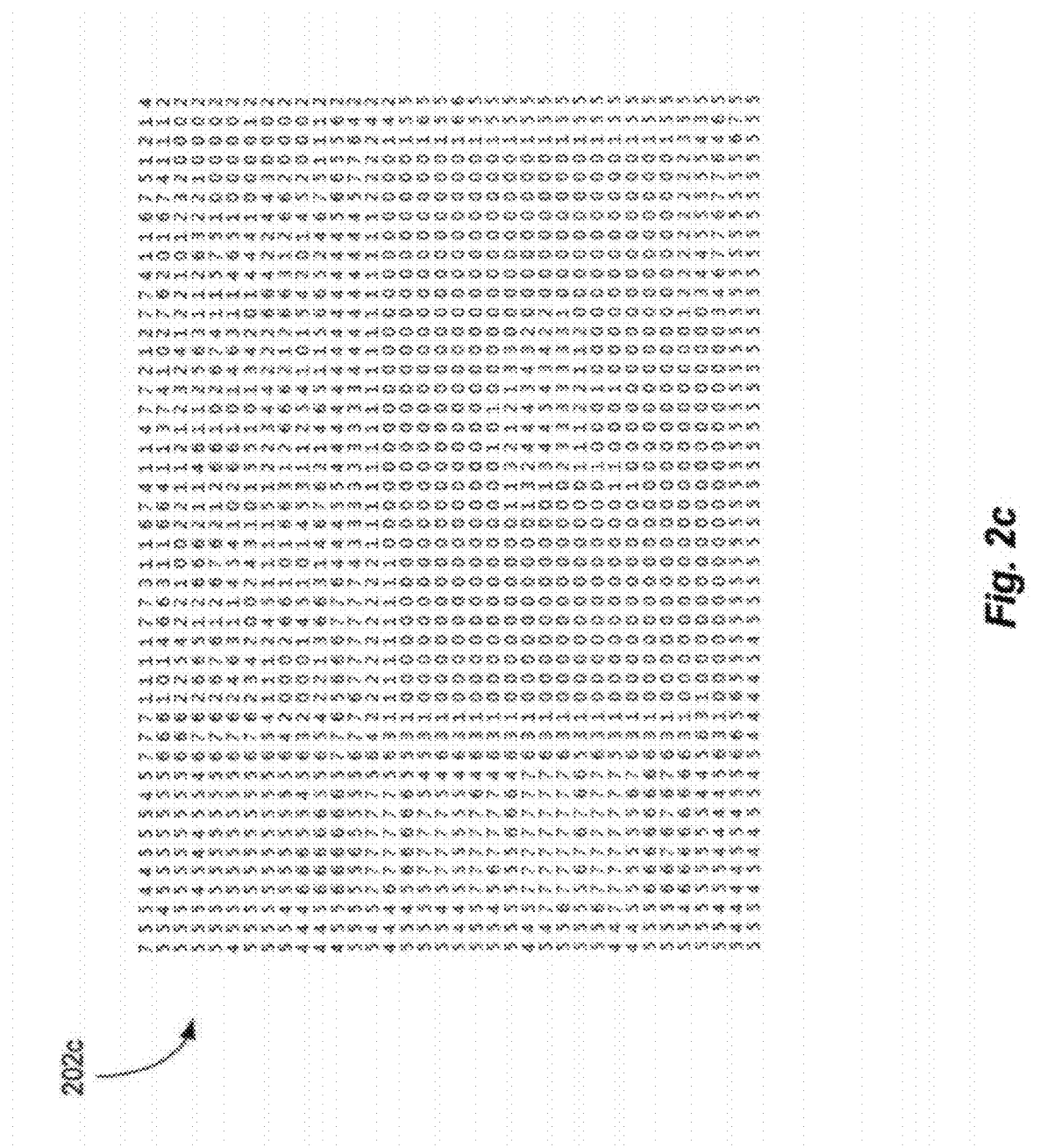
FIG. 2c is a table illustrating still another exemplary distortion imperceptibility map for the exemplary video frame after decoding, in which the distortion imperceptibility levels for the macroblocks in the video frame have been determined using an exemplary second perceptual classification technique that can be implemented by the video transcoding system of FIG. 1.

Using the distortion imperceptibility levels for the MBs in each video frame included in the input bitstream, the perceptual classification component 106 (see FIG. 1) is operative to generate a distortion imperceptibility map for the video frame. The reduction in perceptual classification errors that may be achieved by using the perceptual classification component 106 is illustrated below with reference to FIGS. 2a-2c. FIG. 2a depicts a table illustrating an exemplary distortion imperceptibility map 202a for an exemplary video frame included in an exemplary video bitstream. The distortion imperceptibility values contained in the distortion imperceptibility map 202a of FIG. 2a have been calculated using equation (4) above, and an original video frame that may have been provided as an input to the external video encoder 118 (see FIG. 1). Further, FIG. 2b depicts a table illustrating another exemplary distortion imperceptibility map 202b for the same video frame after decoding by the video decoder 102 (see FIG. 1), in which distortion imperceptibility levels contained in the distortion imperceptibility map 202b have been calculated using equation (4) above. In addition, FIG. 2c depicts a table illustrating still another exemplary distortion imperceptibility map 202c for the same video frame, in which the video frame has been decoded by the video decoder 102 (see FIG. 1), and the distortion imperceptibility levels contained in the distortion imperceptibility map 202c have been calculated by the perceptual classification component 106 (see FIG. 1) using equation (11) above.

To illustrate the reduction in perceptual classification errors that can be achieved by using the perceptual classification component 106, a mean squared error function is employed, as follows, $$\text{classification\_error} = \frac{1}{M*N}\sum_{i=0}^{M-1}\sum_{j=0}^{N-1}|P_{level}(i,j) - P_{org\_level}(i,j)|^2 \quad (14)$$

in which "$P_{level}(i,j)$" corresponds to the distortion imperceptibility level located at position (i,j) in the distortion imperceptibility map 202b or the distortion imperceptibility map 202c, and "$P_{org\_level}(i,j)$" corresponds to the distortion imperceptibility level located at position (i,j) in the distortion imperceptibility map 202a, which is employed as an exemplary reference in the measurement of the perceptual classification errors using equation (14) above.

TABLE I below provides a comparison of the perceptual classification errors measured using equation (14) above, resulting from the use of the distortion imperceptibility levels from the distortion imperceptibility map 202b calculated using equation (4) above, and the use of the distortion imperceptibility levels from the distortion imperceptibility map 202c calculated by the perceptual classification component 106 using equation (11) above.

TABLE I

| Level | Number of MBs per video frame for each level | Total mean squared error per video frame Using equation (4) above | Total mean squared error per video frame Using equation (11) above | Classification error (see equation (14) above) Using equation (4) above | Classification error (see equation (14) above) Using equation (11) above | Classification improvement in % |
|---|---|---|---|---|---|---|
| 0 | 702 | 3.90 | 4.72 | 0.006 | 0.007 | −21.1% |
| 1 | 48 | 25.39 | 27.24 | 0.532 | 0.571 | −7.3% |
| 2 | 43 | 21.58 | 21.84 | 0.504 | 0.510 | −1.2% |
| 3 | 73 | 16.65 | 12.54 | 0.227 | 0.171 | 24.7% |
| 4 | 89 | 30.83 | 15.79 | 0.347 | 0.178 | 48.8% |
| 5 | 335 | 154.36 | 66.37 | 0.461 | 0.198 | 57.0% |
| 6 | 159 | 53.86 | 15.67 | 0.338 | 0.098 | 70.9% |
| 7 | 171 | 24.38 | 4.44 | 0.142 | 0.026 | 81.8% |
| Total | 1620 | 330.95 | 168.61 | 0.204 | 0.104 | 49.1% |

As shown in TABLE I above, the total perceptual classification error resulting from the use of the distortion imperceptibility levels calculated by the perceptual classification component 106 using equation (11) above is 0.104, and the total perceptual classification error resulting from the use of the distortion imperceptibility levels calculated using equation (4) above is 0.204, providing a classification improvement of about 49.1%. Accordingly, as illustrated by TABLE I above, a significant reduction in perceptual classification errors can be achieved using the perceptual classification component 106.

It is noted that, in real-time video communications and video streaming applications, the video encoder 104 within the video transcoding system 100 may be required to send QP information to a video decoder that is external to the video transcoding system 100 (also referred to herein as an/the "external video decoder"). For example, when an input bitstream is encoded into a signal stream compressed according to the H.264 coding format, the video encoder 104 employs a differential coding approach to reduce the number of bits for such QP information. Specifically, such QP information that is sent by the video encoder 104 to the external video decoder includes information pertaining to the difference between the QP for a currently encoded MB, and the QP for an adjacent, previously encoded MB. Further, the video encoder 104 employs fewer bits to indicate smaller QP differences, and more bits to indicate larger QP differences, in such QP information. Frequent changes in QPs for MBs in each video frame can therefore cause an increased number of bits to be consumed for such QP information. It is further noted that larger QP differences for adjacent MBs in each video frame can adversely affect the QoE for transcoded video at the boundaries of the adjacent MBs.

To avoid such potential problems involving QP information that may be sent from the video encoder 104 to an external video decoder, and adjacent MBs in each video frame included in the input bitstream, the perceptual classification component 106 is operative to adjust one or more distortion imperceptibility levels, $D_{plevel}$, in each distortion imperceptibility map, using the distortion imperceptibility levels for the adjacent MBs in the video frame. For example, the distortion imperceptibility level for a currently encoded MB, $D_{plevel}$ [current], in a distortion imperceptibility map, can be adjusted by the perceptual classification component 106, as follows, $$D_{plevel}[\text{current}] = \begin{cases} D_{plevel}[\text{current}] + 2 & \text{if } \left(4 \cdot D_{plevel}[\text{current}] - \sum_{\substack{i=top,bottom,\\left,right}} D_{plevel}[i] < -9\right) \\ D_{plevel}[\text{current}] + 1 & \text{elseif } \left(4 \cdot D_{plevel}[\text{current}] - \sum_{\substack{i=top,bottom,\\left,right}} D_{plevel}[i] < -4\right) \\ D_{plevel}[\text{current}] - 1 & \text{elseif } \left(4 \cdot D_{plevel}[\text{current}] - \sum_{\substack{i=top,bottom,\\left,right}} D_{plevel}[i] > 6\right) \\ D_{plevel}[\text{current}] & \text{otherwise} \end{cases} \quad (15)$$

in which "i" represents one of the 4 positions for the MBs in the video frame, namely, top, bottom, left, and right, and "$D_{plevel}[i]$" represents the distortion imperceptibility level for the MB in the ith position in the video frame. The perceptual classification component 106 is further operative to provide the information contained in the distortion imperceptibility map to the perceptual quantization parameter modulation component 112.

In further accordance with the illustrative embodiment of FIG. 1, the rate control component 108 is operative to generate a QP, and a target number of bits to be allocated for the video frame, using a predetermined rate control function. For example, the predetermined rate control function employed by the rate control component 108 may be a video frame layer rate control function, an MB layer rate control function, a slice layer rate control function, or any other suitable type of rate control function. It is noted that the rate control component 108 can implement the predetermined rate control function independent from the perceptual processing of the input bitstream. The rate control component 108 is further operative to provide an indication of the QP, and the target number of bits to be allocated for the video frame, to the perceptual QP modulation component 112.

Using the information from the distortion imperceptibility map generated by the perceptual classification component 106, and the target number of bits generated by the rate control component 108, the perceptual QP modulation component 112 is operative to modulate the QP for each MB in each video frame included in the input bitstream, based at least on the distortion imperceptibility level for the MB. The perceptual QP modulation component 112 is further operative, for all MBs in the video frame, to find a set of QPs that provides an estimated number of bits to be allocated for the video frame that is closest to the target number of bits generated by the rate control component 108. For example, the perceptual QP modulation component 112 may employ the QP generated by the rate control component 108 as a starting point in the search for a "QP_index" to be used in performing such perceptual QP modulation.

In still further accordance with the illustrative embodiment of FIG. 1, the perceptual QP modulation component 112 is operative to modulate the QP for each MB in each video frame included in the input bitstream using a table look-up approach, which includes obtaining a plurality of QPs for the video frame, one QP for each of the distortion imperceptibility levels employed. It is noted that such a table can be constructed for each predictive video frame (also referred to herein as a/the "P-frame") and each bi-directionally predictive video frame (also referred to herein as a/the "B-frame") included in the input bitstream, based on simulations and/or subjective tests of one or more reconstructed videos. For example, if each MB in a P-frame were classified as one of 8 levels (0, 1, 2, 3, 4, 5, 6, 7), based on the distortion imperceptibility values, $D_p$, for the respective MBs, then the exemplary table of QPs (TABLE II) below may be constructed for the P-frame, in which "perceptual_QP[i][j]" represents the QP associated with distortion imperceptibility level "j," for QP_index "i".

TABLE II

| perceptual_QP[i][j] = { |
|---|
| {0, 0, 0, 0, 0, 0, 0, 0}, |
| {1, 1, 1, 1, 1, 1, 1, 1}, |
| {2, 2, 2, 2, 2, 2, 2, 2}, |
| {3, 3, 3, 3, 3, 3, 3, 3}, |
| {4, 4, 4, 4, 4, 4, 4, 4}, |
| {5, 5, 5, 5, 5, 5, 5, 5}, |
| {6, 6, 6, 6, 6, 6, 6, 6}, |
| {7, 7, 7, 7, 7, 7, 7, 7}, |
| {8, 8, 8, 8, 8, 8, 8, 8}, |
| {9, 9, 9, 9, 9, 9, 9, 9}, |
| {10, 10, 10, 10, 10, 10, 10, 10 }, |
| {11, 11, 11, 11, 11, 11, 11, 11 }, |
| {12, 12, 12, 12, 12, 12, 12, 12 }, |
| {13, 13, 13, 13, 13, 13, 13, 13 }, |
| {14, 14, 14, 14, 14, 14, 14, 14 }, |
| {15, 15, 15, 15, 15, 15, 15, 15 }, |
| {16, 16, 16, 16, 16, 16, 16, 16 }, |
| {17, 17, 17, 17, 17, 17, 17, 17 }, |
| {18, 18, 18, 18, 18, 18, 18, 18 }, |
| {19, 19, 19, 19, 19, 19, 19, 19 }, |
| {19, 19, 19, 19, 20, 20, 20, 20 }, |
| {19, 19, 19, 20, 21, 21, 22, 23 }, |
| {20, 20, 20, 21, 22, 22, 23, 24 }, |
| {20, 20, 21, 22, 23, 24, 24, 25 }, |
| {20, 21, 22, 23, 24, 25, 25, 26 }, |
| {20, 22, 23, 24, 25, 26, 27, 28 }, |
| {20, 22, 24, 25, 26, 27, 27, 28 }, |
| {20, 22, 24, 26, 27, 28, 28, 29 }, |
| {20, 22, 25, 27, 28, 29, 29, 30 }, |
| {21, 23, 25, 27, 28, 29, 29, 30 }, |
| {21, 23, 26, 28, 28, 29, 29, 31 }, |
| {21, 24, 26, 28, 29, 30, 30, 31 }, |
| {21, 24, 27, 29, 29, 30, 31, 32 }, |
| {21, 24, 27, 30, 31, 31, 32, 33 }, |

TABLE II-continued perceptual_QP[i][j] = {

{22, 25, 27, 30, 31, 32, 33, 33 },
{22, 25, 28, 31, 31, 32, 33, 33 },
{22, 25, 28, 31, 32, 33, 33, 34 },
{23, 26, 28, 31, 32, 33, 34, 34 },
{23, 26, 29, 32, 32, 33, 34, 34 },
{23, 26, 29, 32, 33, 34, 34, 35 },
{24, 27, 29, 32, 33, 34, 35, 35 },
{24, 27, 30, 33, 34, 35, 35, 36 },
{25, 28, 30, 33, 34, 35, 36, 36 },
{25, 28, 31, 34, 34, 35, 36, 37 },
{26, 29, 31, 34, 35, 35, 36, 37 },
{26, 29, 32, 35, 35, 36, 36, 37 },
{26, 29, 32, 35, 36, 37, 37, 38 },
{26, 29, 32, 36, 36, 37, 38, 39 },
{27, 30, 33, 36, 37, 38, 38, 40 },
{27, 30, 34, 37, 37, 38, 39, 40 },
{27, 31, 34, 37, 38, 39, 39, 41 },
{28, 31, 34, 38, 39, 39, 40, 41 },
{28, 32, 35, 38, 39, 40, 40, 41 },
{28, 32, 35, 39, 39, 40, 41, 42 },
{28, 32, 36, 39, 40, 41, 42, 43 },
{29, 33, 36, 39, 41, 42, 42, 43 },
{29, 33, 37, 40, 41, 42, 43, 43 },
{29, 33, 37, 41, 42, 43, 43, 44 },
{30, 34, 37, 42, 43, 44, 44, 45 },
{30, 34, 38, 43, 43, 44, 45, 45 },
{30, 34, 38, 43, 44, 45, 45, 46 },
{31, 35, 38, 43, 45, 45, 45, 46 },
{31, 35, 39, 43, 45, 45, 46, 46 },
{32, 36, 39, 44, 45, 46, 47, 47 },
{32, 36, 40, 44, 46, 46, 47, 47 },
{33, 37, 40, 44, 47, 47, 47, 47 },
{33, 37, 41, 45, 47, 47, 47, 48 },
{34, 38, 41, 46, 47, 47, 47, 48 },
{34, 38, 42, 46, 47, 48, 48, 48 },
{35, 39, 42, 46, 48, 48, 48, 48 },
{35, 39, 42, 47, 48, 48, 48, 49 },
{36, 39, 43, 48, 48, 48, 48, 49 },
{36, 40, 43, 48, 48, 48, 49, 49 },
{37, 40, 44, 48, 48, 48, 49, 50 },
{37, 40, 44, 48, 48, 49, 49, 50 },
{38, 41, 44, 49, 49, 49, 49, 50 },
{39, 41, 45, 49, 49, 49, 50, 50 },
{39, 42, 45, 49, 49, 49, 50, 50 },
{40, 43, 45, 49, 49, 50, 50, 50 },
{41, 43, 46, 49, 50, 50, 50, 50 },
{41, 44, 46, 50, 50, 50, 50, 51 },
{42, 44, 46, 50, 50, 50, 51, 51 },
{43, 45, 46, 50, 51, 51, 51, 51 },
{43, 45, 47, 51, 51, 51, 51, 51 },
{44, 45, 47, 51, 51, 51, 51, 51 },
{44, 46, 48, 51, 51, 51, 51, 51 },
{45, 47, 48, 51, 51, 51, 51, 51 },
{45, 47, 49, 51, 51, 51, 51, 51 },
{46, 47, 49, 51, 51, 51, 51, 51 },
{46, 48, 49, 51, 51, 51, 51, 51 },
{47, 48, 50, 51, 51, 51, 51, 51 },
{47, 49, 51, 51, 51, 51, 51, 51 },
{48, 50, 51, 51, 51, 51, 51, 51 },
{49, 51, 51, 51, 51, 51, 51, 51 },
{50, 51, 51, 51, 51, 51, 51, 51 },
{51, 51, 51, 51, 51, 51, 51, 51 } };

Using the table of QPs (TABLE II) above, the perceptual QP modulation component 112 is operative to search for the QP_index that provides an estimated number of bits to be allocated for the P-frame that is closest to the target number of bits generated by the rate control component 108. For example, the perceptual QP modulation component 112 may employ a bisectional search algorithm that starts the search using the QP generated by the rate control component 108, and iterates the search until the QP_index that estimates the number of bits to be allocated for the P-frame closest to the target number of bits is found. In a similar fashion, a table of QPs may be constructed for each B-frame, and used to search for a QP_index that provides an estimated number of bits to be allocated for the B-frame that is closest to a target number of bits generated by the rate control component 108. The perceptual QP modulation component 112 is further operative to provide the modulated QPs for the MBs in the video frame to the quantization component 114.

In addition, the motion estimation and compensation component 110 is operative to perform motion estimation for each MB in the video frame to obtain one or more motion vectors, to perform motion compensated prediction using the motion vector(s), to calculate motion compensated prediction errors (also referred to herein as the "MCP errors") for each MB in the video frame, and to provide the MCP errors for the respective video frames to the transformation component 111, which, in turn, transforms the MCP errors into transform coefficients describing prediction correction, and provides the transform coefficients to the quantization component 114. Using the modulated QPs for the MBs in each video frame from the perceptual QP modulation component 112, and the transform coefficients from the transformation component 111, the quantization component 114 is operative to quantize the transform coefficients for the respective video frame, and to provide quantized versions of the transform coefficients for the respective video frame to the coding component 116. Moreover, the coding component 116 is operative to encode the quantized transform coefficients for the respective video frame, and to provide the transcoded video in an output video bitstream (also referred to herein as an/the "output bitstream") for subsequent display to the end user.

Figure 3A:
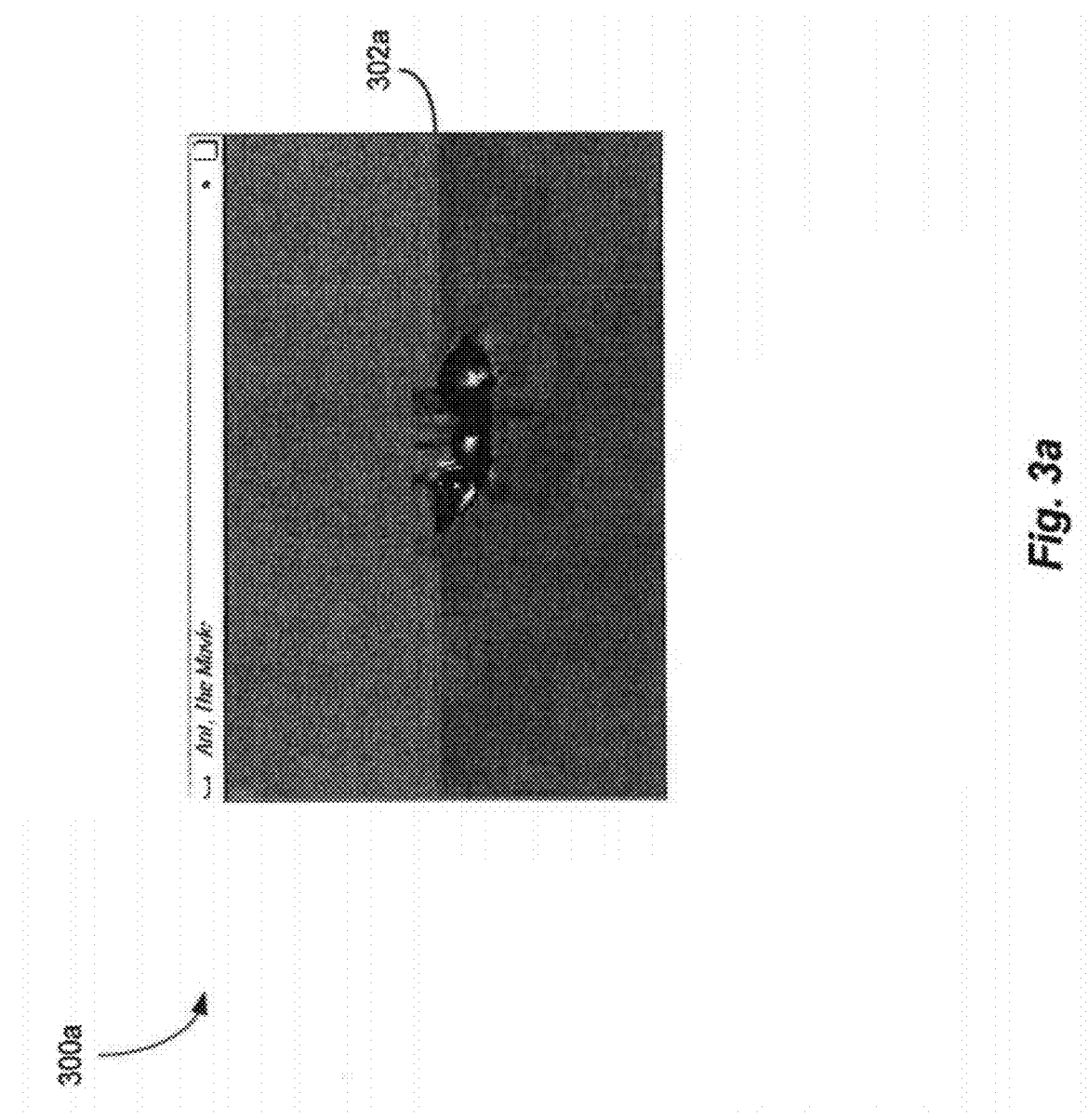
FIG. 3a is a display window illustrating the exemplary video frame, which has not been subjected to perceptual processing.

FIG. 3a depicts an illustrative display window 300a containing the exemplary video frame (designated by reference numeral 302a) discussed above with reference to the distortion imperceptibility maps 202a (see FIG. 2a), 202b (see FIG. 2b), and 202c (see FIG. 2c). In accordance with the illustrative display window 300a of FIG. 3a, the exemplary video bitstream including the video frame 302a has an exemplary bit rate of about 450 kilobits per second (kbps) and an exemplary frame rate of about 30 frames per second (fps), and has not been subjected to perceptual processing. As shown in FIG. 3a, the video frame 302a depicts, as an example, an insect (e.g., an "ant") on a checkerboard.

Figure 3B:
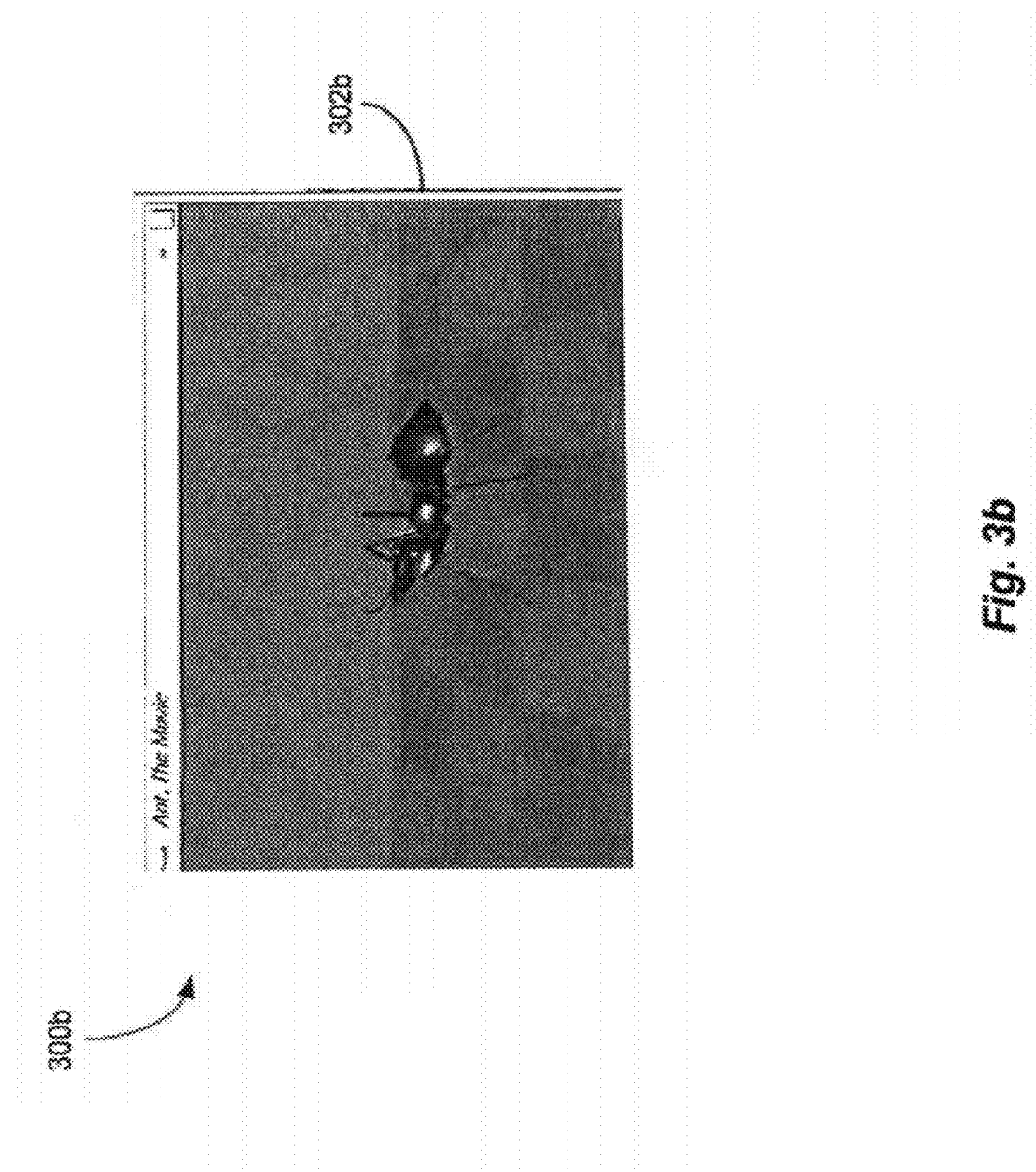
FIG. 3b is another display window illustrating the exemplary video frame of FIG. 3a, in which the video frame has undergone perceptual processing by the video transcoding system of FIG. 1.

FIG. 3b depicts another illustrative display window 300b containing the exemplary video frame (designated by reference numeral 302b). In accordance with the illustrative display window 300b of FIG. 3b, the exemplary video bitstream including the video frame 302b again has the exemplary bit rate of about 450 kbps, and the exemplary frame rate of about 30 fps. However, unlike the video bitstream including the video frame 302a depicted in FIG. 3a, the video bitstream including the video frame 302b depicted in FIG. 3b has undergone perceptual processing by the perceptual classification component 106 (see FIG. 1). As shown in FIG. 3b, the video frame 302b depicts the ant on the checkerboard. Having performed such perceptual processing on the video bitstream including the video frame 302b, it can be observed by the human visual system (also referred to herein as a/the "HVS") that at least the legs of the ant and the checkerboard pattern depicted in FIG. 3b are visually clearer and more discernable than the legs of the ant and the checkerboard pattern depicted in FIG. 3a.

Figure 4:
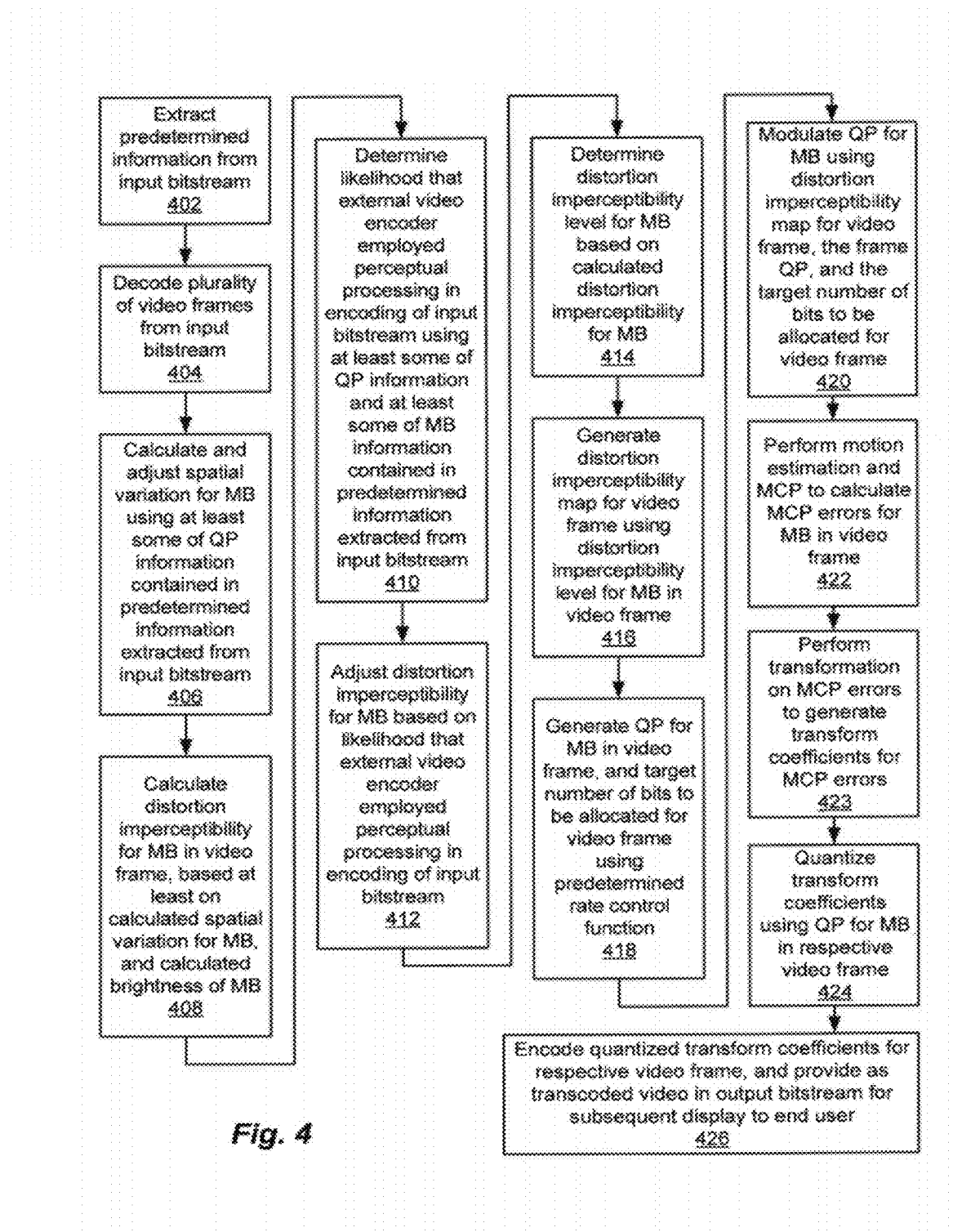
FIG. 4 is a flow diagram of an exemplary method of operating the video transcoding system of FIG. 1.

An illustrative method 400 of operating the video transcoding system 100 is depicted in FIG. 4 and is described below, with reference as well to FIG. 1. As depicted in step 402 (see FIG. 4), predetermined information, including video frame information, QP information, and MB information, is extracted, by the video decoder 102 (see FIG. 1), from an input bitstream. Further, as depicted in step 404, a plurality of video frames are decoded, by the video decoder 102, from the input bitstream. As depicted in step 406, a spatial variation for each of at least some of the MBs in each of at least some of the video frames is calculated and adjusted, by the perceptual classification component 106 (see FIG. 1), using at least some of the QP information contained in the predetermined information extracted from the input bitstream. As depicted in step 408, a distortion imperceptibility is calculated, by the perceptual classification component 106, for the MB in the video frame, based at least on the calculated spatial variation for the respective MB and a calculated brightness of the respective MB. As depicted in step 410, a likelihood that the external video encoder 118 (see FIG. 1) employed perceptual processing in the encoding of the input bitstream is determined, by the perceptual classification component 106, using at least some of the QP information and at least some of the MB information contained in the predetermined information extracted from the input bitstream. As depicted in step 412, the distortion imperceptibility for the MB in the video frame is adjusted, by the perceptual classification component 106, based at least on the likelihood that the external video encoder 118 employed such perceptual processing in the encoding of the input bitstream. As depicted in step 414, for the MB in the video frame, a distortion imperceptibility level is determined, by the perceptual classification component 106, based on the calculated distortion imperceptibility for the respective MB. As depicted in step 416, a distortion imperceptibility map is generated for the video frame, by the perceptual classification component 106, using the distortion imperceptibility level for the MB in the respective video frame. As depicted in step 418, a QP for the MB in the video frame, and a target number of bits to be allocated for the respective video frame, are generated, by the rate control component 108 (see FIG. 1), using a predetermined rate control function. As depicted in step 420, the QP for the MB in the video frame is modulated, by the perceptual QP modulation component 112 (see FIG. 1), using the distortion imperceptibility map for the respective video frame from the perceptual classification component 106 (see FIG. 1), and the frame QP and the target number of bits to be allocated for the respective video frame from the rate control component 108 (see FIG. 1). As depicted in step 422, motion estimation followed by motion compensated prediction (MCP) are performed, by the motion estimation and compensation component 110 (see FIG. 1), to calculate MCP errors for the MB in the video frame. As depicted in step 423, transformation is performed, by the transformation component 111, on the MCP errors for the MB in the video frame to generate transform coefficients for the MCP errors for the respective video frame. As depicted in step 424, the transform coefficients for the video frame are quantized, by the quantization component 114 (see FIG. 1), using the QP for the MB in the respective video frame. As depicted in step 426, the quantized transform coefficients for the respective video frame are encoded, by the coding component 116, and provided as transcoded video in an output bitstream, for subsequent display to the end user.

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of transcoding a coded video bitstream in a video transcoding system, comprising the steps of:
   receiving, at the video transcoding system from an external video encoder, a coded video bitstream including a plurality of video frames, each video frame including a plurality of macroblocks (MBs), the coded video bitstream being encoded in a first coding format, at least some of the plurality of MBs being encoded in accordance with a predetermined coding mode;
   decoding the plurality of video frames in the coded video bitstream;
   extracting predetermined information from the coded video bitstream;
   calculating, using at least some of the predetermined information, a likelihood value indicative of a likelihood that the coded video bitstream has been previously processed at the external video encoder to account for one or more perceptual insensitivity characteristics of a human visual system;
   performing a comparison of the likelihood value and a predetermined threshold value;

in response to the comparison indicating the likelihood of the coded video bitstream being previously processed at the external video encoder, for each of at least some of the plurality of video frames in the coded video bitstream:
  calculating, using at least some of the predetermined information, a distortion imperceptibility value for each of at least some of the plurality of MBs in the video frame as a function of at least a difference between an actual quantization parameter (QP) used by the external video encoder to encode the macroblock (MB), and an average QP used by the external video encoder to encode the respective MBs, the distortion imperceptibility value representing the imperceptibility of a presence of distortion in the MB with respect to the human visual system;
  determining one or more quantization parameters (QPs) for the respective MBs encoded in accordance with the predetermined coding mode;
  adjusting the distortion imperceptibility value for each of at least some of the plurality of MBs in the video frame based at least on one or more of the determined QPs for the respective MBs encoded in accordance with the predetermined coding mode;
  calculating a QP for each of at least some of the plurality of MBs in the video frame using the adjusted distortion imperceptibility values for the respective MBs in the video frame; and
  encoding the video frame in a second coding format using the calculated QPs for the respective MBs in the video frame; and
providing the plurality of video frames in an output video bitstream.

2. The method of claim 1 further comprising:
for each of at least some of the plurality of video frames in the coded video bitstream, calculating a spatial variation for the MB in the video frame.

3. The method of claim 2 wherein the predetermined information includes QP information for the respective macroblocks in the video frame, and wherein the method further comprises, for each of at least some of the plurality of video frames in the coded video bitstream:
  adjusting the spatial variation for the MB in the video frame based on at least some of the QP information for the respective macroblocks.

4. The method of claim 3 wherein the calculating of the distortion imperceptibility value for the MB in the video frame includes calculating the distortion imperceptibility value for the MB in the video frame based on at least the spatial variation for the respective MB.

5. The method of claim 4 further comprising, for each of at least some of the plurality of video frames in the coded video bitstream, calculating a brightness of the MB in the video frame, and wherein the calculating of the distortion imperceptibility value for the MB in the video frame includes calculating the distortion imperceptibility value for the MB in the video frame based on at least (a) the spatial variation for the respective MB, and (b) the brightness of the respective MB.

6. The method of claim 1 wherein the predetermined information includes at least (a) QP information for the respective macroblocks in the video frame, and (b) MB information for the respective macroblocks in the video frame, and wherein the method further comprises:
  determining the likelihood of the coded video bitstream being previously processed at the external video encoder based on at least some of the QP information and the MB information for the respective macroblocks.

7. The method of claim 1 further comprising, for each of at least some of the plurality of video frames in the coded video bitstream:
  determining a distortion imperceptibility level for the MB in the video frame based on at least the distortion imperceptibility value for the respective MB.

8. The method of claim 7 further comprising, for each of at least some of the plurality of video frames in the coded video bitstream:
  generating a distortion imperceptibility map for the video frame, the distortion imperceptibility map containing information based on at least the distortion imperceptibility level for the MB in the video frame.

9. The method of claim 8 further comprising, for each of at least some of the plurality of video frames in the coded video bitstream:
  generating a QP for the MB in the video frame, and a target number of bits to be allocated for the video frame, using a predetermined rate control function.

10. The method of claim 9 further comprising, for each of at least some of the plurality of video frames in the coded video bitstream:
  modulating the QP for the MB in the video frame using one or more of the information contained in the distortion imperceptibility map for the video frame, the QP for the respective MB, and the target number of bits to be allocated for the video frame.

11. The method of claim 7 wherein the predetermined information includes video frame information, wherein the distortion imperceptibility level for the MB in the video frame has an associated threshold value, each associated threshold value being dependent upon a resolution of the video frame, and wherein the method further comprises, for each of at least some of the plurality of video frames in the coded video bitstream:
  determining the resolution of the video frame based on at least some of the video frame information.

12. The method of claim 1 further comprising, for each of at least some of the plurality of video frames in the coded video bitstream:
  calculating motion compensated prediction errors (MCP errors) for the video frame.

13. The method of claim 12 further comprising, for each of at least some of the plurality of video frames in the coded video bitstream:
  transforming the MCP errors to generate transform coefficients for the MCP errors for the video frame.

14. The method of claim 13 further comprising, for each of at least some of the plurality of video frames in the coded video bitstream:
  quantizing the transform coefficients using one or more of the QPs for the respective macroblocks in the video frame.

15. The method of claim 1 wherein the providing of the plurality of video frames in the output video bitstream includes providing the plurality of video frames in the output video bitstream for subsequent display to an end user.

16. The method of claim 1 wherein the predetermined coding mode is a skip coding mode, and wherein the determining of the one or more QPs includes estimating one or more QPs for the respective MBs encoded in accordance with the skip coding mode.

17. The method of claim 16 wherein the adjusting of the distortion imperceptibility value includes adjusting the distortion imperceptibility value for each of at least some of the plurality of MBs in the video frame based at least on the estimated QPs for the respective MBs encoded in accordance with the skip coding mode.

18. A video transcoding system, comprising:
a video decoder operative (a) to receive a coded video bitstream from an external video encoder, (b) to decode a plurality of video frames in the coded video bitstream, and (b) to extract predetermined information from the coded video bitstream, each video frame including a plurality of macroblocks (MBs), the coded video bitstream being encoded in a first coding format, at least some of the plurality of MBs being encoded in accordance with a predetermined coding mode; and
a video encoder operative, for each of at least some of the plurality of video frames in the coded video bitstream:
to calculate, using at least some of the predetermined information, a likelihood value indicative of a likelihood that the coded video bitstream has been previously processed at the external video encoder to account for one or more perceptual insensitivity characteristics of a human visual system;
to perform a comparison of the likelihood value and a predetermined threshold value;
in response to the comparison indicating the likelihood of the coded video bitstream being previously processed at the external video encoder, for each of at least some of the plurality of video frames in the coded video bitstream:
to calculate, using at least some of the predetermined information, a distortion imperceptibility value for each of at least some of the plurality of MBs in the video frame as a function of at least a difference between an actual quantization parameter (QP) used by the external video encoder to encode the macroblock (MB), and an average QP used by the external video encoder to encode the respective MBs, the distortion imperceptibility value representing the imperceptibility of a presence of distortion in the MB with respect to the human visual system;
to determine one or more quantization parameters (QPs) for the respective MBs encoded in accordance with the predetermined coding mode;
to adjust the distortion imperceptibility value for each of at least some of the plurality of MBs in the video frame based at least on one or more of the determined QPs for the respective MBs encoded in accordance with the predetermined coding mode;
to calculate a QP for each of at least some of the plurality of MBs in the video frame using the adjusted distortion imperceptibility values for the respective MBs in the video frame; and
to encode the video frame in a second coding format using the calculated QPs for the respective MBs in the video frame; and
to provide the plurality of video frames in an output video bitstream.

19. The system of claim 18 wherein the encoder is further operative to provide the plurality of video frames in the output video bitstream for subsequent display to an end user.

20. A method of transcoding a coded video bitstream in a video transcoding system, comprising the steps of:
receiving, at the video transcoding system from an external video encoder, a coded video bitstream including a plurality of video frames, each video frame including a plurality of macroblocks (MBs), the coded video bitstream being encoded in a first coding format, at least some of the plurality of MBs being encoded in accordance with a predetermined coding mode;
decoding the plurality of video frames in the coded video bitstream;
extracting predetermined information from the coded video bitstream, the predetermined information including at least quantization parameter (QP) information for the respective MBs in the video frame, and macroblock (MB) information for the respective MBs in the video frame;
calculating, using at least the QP information and the MB information, a likelihood value indicative of a likelihood that the coded video bitstream has been previously processed at the external video encoder to account for one or more perceptual insensitivity characteristics of a human visual system;
performing a comparison of the likelihood value and a predetermined threshold value;
in response to the comparison indicating the likelihood of the coded video bitstream being previously processed at the external video encoder, for each of at least some of the plurality of video frames in the coded video bitstream:
calculating a spatial variation for each of at least some of the plurality of MBs in the video frame;
adjusting the spatial variation for the MB in the video frame based on at least some of the QP information for the respective MBs;
calculating a brightness of the MB in the video frame;
calculating a distortion imperceptibility value for the MB in the video frame based on at least (a) the spatial variation for the respective MB, and (b) the brightness of the respective MB, the distortion imperceptibility value representing the imperceptibility of a presence of distortion in the respective MB with respect to the human visual system;
determining one or more quantization parameters (QPs) for the respective MBs encoded in accordance with the predetermined coding mode;
adjusting the distortion imperceptibility value for the MB in the video frame based at least on one or more of the determined QPs for the respective MBs encoded in accordance with the predetermined coding mode;
calculating a QP for the MB in the video frame using the adjusted distortion imperceptibility values for the respective MBs in the video frame; and
encoding the video frame in a second coding format using the calculated QPs for the respective MBs in the video frame; and
providing the plurality of video frames in an output video bitstream.

21. A method of transcoding a coded video bitstream in a video transcoding system, comprising the steps of:
receiving, at the video transcoding system from an external video encoder, a coded video bitstream including a plurality of video frames, each video frame including a plurality of macroblocks (MBs), the coded video bitstream being encoded in a first coding format, at least some of the plurality of MBs being encoded in accordance with a predetermined coding mode;
decoding the plurality of video frames in the coded video bitstream;
extracting predetermined information from the coded video bitstream, the predetermined information including at least quantization parameter (QP) information, macroblock (MB) information, and video frame information;

calculating, using at least the QP information and the MB information, a likelihood value indicative of a likelihood that the coded video bitstream has been previously processed at the external video encoder to account for one or more perceptual insensitivity characteristics of a human visual system;

performing a comparison of the likelihood value and a predetermined threshold value;

in response to the comparison indicating the likelihood of the coded video bitstream being previously processed at the external video encoder, for each of at least some of the plurality of video frames in the coded video bitstream:

calculating, using at least the QP information, a distortion imperceptibility value for each of at least some of the plurality of MBs in the video frame as a function of at least a difference between an actual QP used by the external video encoder to encode the MB, and an average QP used by the external video encoder to encode the respective MBs, the distortion imperceptibility value representing the imperceptibility of a presence of distortion in the macroblock (MB) with respect to the human visual system;

determining one or more quantization parameters (QPs) for the respective MBs encoded in accordance with the predetermined coding mode;

adjusting the distortion imperceptibility value for each of at least some of the plurality of MBs in the video frame based at least on one or more of the determined QPs for the respective MBs encoded in accordance with the predetermined coding mode;

determining a distortion imperceptibility level for the MB in the video frame based on at least the adjusted distortion imperceptibility value for the respective MB, the distortion imperceptibility level for the MB in the video frame having an associated threshold value, each associated threshold value being dependent upon a resolution of the video frame;

determining the resolution of the video frame based on at least some of the video frame information;

generating a distortion imperceptibility map for the video frame, the distortion imperceptibility map containing information based on at least the distortion imperceptibility level for the MB in the video frame;

calculating a first QP for the MB in the video frame, and a target number of bits to be allocated for the video frame, using a predetermined rate control function;

modulating the first QP for the MB in the video frame using one or more of the information contained in the distortion imperceptibility map for the video frame, and the target number of bits to be allocated for the video frame;

calculating a second QP for the MB in the video frame using the distortion imperceptibility values for the respective MBs in the video frame;

calculating motion compensated prediction errors (MCP errors) for the video frame;

transforming the MCP errors to generate transform coefficients for the MCP errors for the video frame;

quantizing the transform coefficients for the MCP errors using one or more of the calculated quantization parameters (QPs) for the respective MBs in the video frame; and encoding the video frame in a second coding format using the calculated quantization parameters for the respective MBs in the video frame; and providing the plurality of video frames in an output video bitstream.

* * * * *